United States Patent
Kawai

(10) Patent No.: US 6,722,633 B2
(45) Date of Patent: Apr. 20, 2004

(54) THROTTLE BODY WITH INSERT-MOLDED MEMBER

(75) Inventor: Yutaka Kawai, Hekinan (JP)

(73) Assignee: Denso Corporation, Kariya (JP)

( * ) Notice: Subject to any disclaimer, the term of this patent is extended or adjusted under 35 U.S.C. 154(b) by 151 days.

(21) Appl. No.: 10/046,305

(22) Filed: Jan. 16, 2002

(65) Prior Publication Data

US 2002/0100892 A1 Aug. 1, 2002

(30) Foreign Application Priority Data

Jan. 29, 2001 (JP) .......................... 2001-020429
Nov. 22, 2001 (JP) .......................... 2001-358116

(51) Int. Cl.[7] .................................................. F16K 1/22
(52) U.S. Cl. .................. 251/305; 251/316; 137/315.22; 137/454.2; 137/797
(58) Field of Search ................................ 251/305, 306, 251/316, 367; 137/797, 454.2, 315.22, 315.23, 315.24; 285/305, 306, 3, 4, 319, 921

(56) References Cited

U.S. PATENT DOCUMENTS

| 4,753,458 A | * | 6/1988 | Case et al. .............. 285/93 |
| 5,131,363 A | | 7/1992 | Ganser |
| 5,188,078 A | | 2/1993 | Tamaki |
| 5,794,591 A | | 8/1998 | Kalebjian et al. |
| 6,125,536 A | | 10/2000 | Spurny |
| 6,427,975 B1 | * | 8/2002 | Powell ................... 251/305 |
| 6,446,934 B2 | * | 9/2002 | Bonomi ................... 251/306 |

FOREIGN PATENT DOCUMENTS

| DE | 40 24 042 C1 | 10/1991 |
| EP | 0926336 A2 | 6/1999 |
| JP | 10-306736 | 11/1998 |
| JP | 11-310025 | 11/1999 |
| JP | 2000-127744 | 5/2000 |

* cited by examiner

Primary Examiner—Edward K. Look
Assistant Examiner—John K. Fristoe, Jr.
(74) Attorney, Agent, or Firm—Nixon & Vanderhye P.C.

(57) ABSTRACT

In a throttle body, a cylindrical body member is made of resin, and a core is made of a material different from the body member and insert molded in the body member. A notch is provided on an outer surface of the body in a peripheral direction, in a proximity of the core. The body member is readily split at the notch when external force is applied to the body member during a dismantling. Therefore, the core is readily removed from the body member. Alternatively, the body member can be constructed of a first body having a hook and a second body having a hook-receiving portion. Both the first and second bodies are connected to each other through the hook and the hook-receiving portion, and the core is held between both the first and second bodies. Thus, the core is readily removed from the body by unhooking the hook.

19 Claims, 3 Drawing Sheets

THROTTLE BODY WITH INSERT-MOLDED MEMBER

CROSS-REFERENCE TO RELATED APPLICATION

This application relates to and incorporated herein by reference Japanese Patent Applications No. 2001-20429 filed on Jan. 29, 2001 and No. 2001-358116 filed on Nov. 22, 2001.

FIELD OF THE INVENTION

The present invention relates to a molded unit such as a throttle provided in an air intake system of an engine, more particularly, the present invention relates to a resinous throttle body readily dismantled for recycling.

BACKGROUND OF THE INVENTION

In a throttle body as proposed in JP-A-10-306736, a metallic insert core is insert-molded in a resinous cylindrical body in the proximity of a throttle valve, in order to prevent deformation or freezing due to hot water heating and to accurately provide a bore size of the body around the throttle valve. In this kind of throttle body, it is difficult to separate the throttle body into resin parts and different material parts, for recycling after it is used.

SUMMARY OF THE INVENTION

The present invention is made in view of the above problem, and it is an object to provide a throttle body in which resin parts are readily separated from metal parts only using external force, without using a specific tool for recycling after it is used.

According to a first aspect of the present invention, a cylindrical body member is made of resin, and a core made of a material different from the body is insert-molded in the body member. The body member has a notch on its outer surface at least at a part in a peripheral direction of the body member, in the proximity of a position where the core is inserted. In this structure, when external force is applied to the body against an axial direction thereof during a dismantling after the body member is used, the body member is readily split at the notch. Therefore, the core is readily removed from the body member.

According to a second aspect of the present invention, a cylindrical resinous body member has a first body member and a second body member. The first body member has a hook and the second body member has a hook-receiving portion, so that the first and the second body members are connected to each other through an engagement between the hook and the hook-receiving portion. A core made of a material different from that of the body member is held by the first and the second body members inside the cylindrical body member. Therefore, the first body member, the second body member and the core are readily separated by unhooking the hook.

Accordingly, in a molded unit with an insert-molded member, the insert-molded member made of a material different from that of a resinous body is readily removed from the molded unit during a disassembly or a dismantling after being used. Therefore, a recycling of the molded unit with the insert-molded member is readily performed.

BRIEF DESCRIPTION OF THE DRAWINGS

Other objects, features and advantages of the present invention will become more apparent from the following detailed description made with reference to the accompanying drawings, in which.

DETAILED DESCRIPTION OF PREFERRED EMBODIMENTS (First Embodiment)

Figure 1:
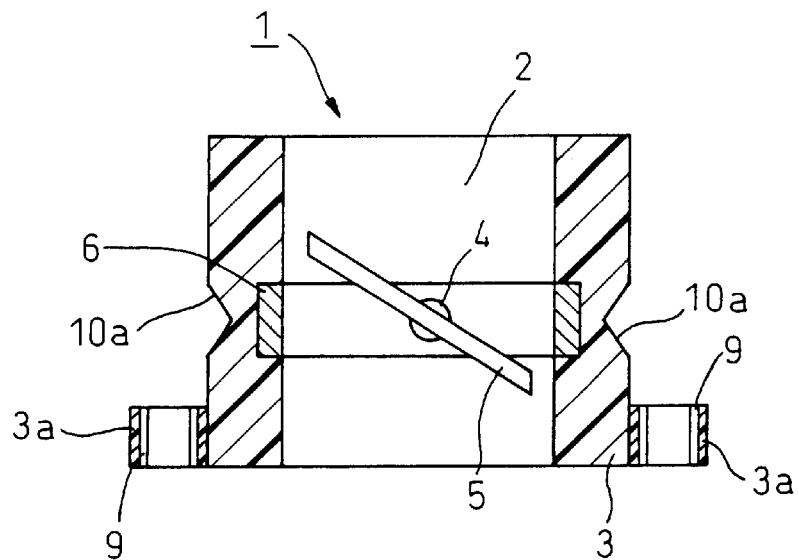
FIG. 1 is a cross-sectional view of a throttle body according to a first embodiment of the present invention.
Figure 2:
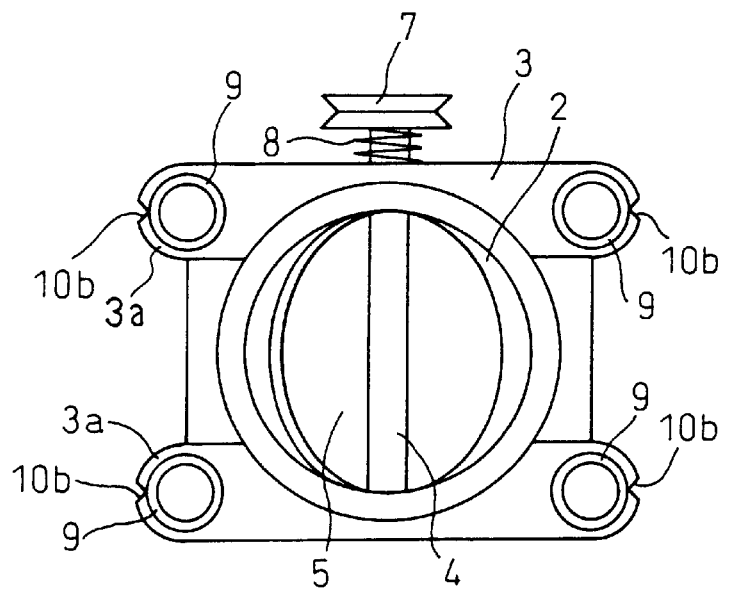
FIG. 2 is the throttle body of FIG. 1 shown from a top.

As shown in FIGS. 1 and 2, a throttle body 1 includes a body member 3, a throttle shaft 4, a throttle valve 5 and an insert core 6. The body member 3 has a substantial cylindrical-shape and defines an air intake passage 2 therein. The body member 3 is made of thermoplastic engineering plastic such as PBT (poly butylene terephthalate) resin and PPS (polyphenylene sulfide) resin. The insert core 6 is integrally provided within the body member 3 by insert-molding and defines the air intake passage 2. The insert core 6 is made of a material different from the resin of the body member 3, for example, iron and aluminum alloy. The throttle shaft 4 is rotatably provided in the body member 3 in the proximity of the insert core 6. The throttle valve 5 is attached to the throttle shaft 4 so as to open/close the air intake passage 2.

The throttle shaft 4 is supported at bearing portions provided on the insert core 6 through bearing bushes (not shown). Both side ends of the throttle shaft 4 penetrate through the cylindrical wall of the body member 3. An acceleration lever 7 is provided at one of side ends of the throttle shaft 4. An acceleration wire (not shown) interlocked to an acceleration pedal (not shown) is wound around the acceleration lever 7. A return spring 8 is interposed between the acceleration lever 7 and the body member 3 to bias the acceleration lever 7 in a direction to fully close the throttle valve 5.

The body member 3 has four flanges 3a to mount the throttle body 1 onto the engine. For example, the four flanges 3a are positioned substantially at four corners in a rectangular shape. Similar to the insert core 6, collars 9 are integrally provided within the flanges 3a by insert-molding. The collars 9 are made of a material, such as iron, different from the resin.

As shown in FIGS. 1 and 2, notches 10a and 10b are formed on the resinous body member 3. The notch 10a is entirely circumferentially or partially formed on the outer cylindrical wall of the body member 3 in an identical circumferential direction of the body member 3, in the proximity of a position where the insert core 6 is casted. The notches 10b are formed on the outer walls of the flanges 3a in which the collars 9 are casted, in the axial direction of the collars 9.

According to this structure, when bending force larger than a predetermined force is applied to the throttle body 1 while the throttle body 1 is dismantled (disassembled) after it is used, the body member 3 is split at the notch 10a. Therefore, the insert core 6 is readily removed from the body member 3. Further, when external force larger than a predetermined force is applied to the notches 10b, the flanges 3a are readily split at the notches 10b. Therefore, it is easy to remove the collars 9 made of the different material from the resinous body member 3.

The notch 10a is formed on the outer cylindrical wall of the body member 3 at a position corresponding to a substantially middle of the insert core 6 in the axial direction of the body member 3. Therefore, when the throttle body 1 is split at the notch 10a while the throttle body 1 is dismantled after it is used, at least half of the insert core 6 is exposed from the split resinous body member 3. Accordingly, the insert core 6 is readily clamped (grasped) at the exposed portion, and can be readily removed from the resin parts.

Figure 3:
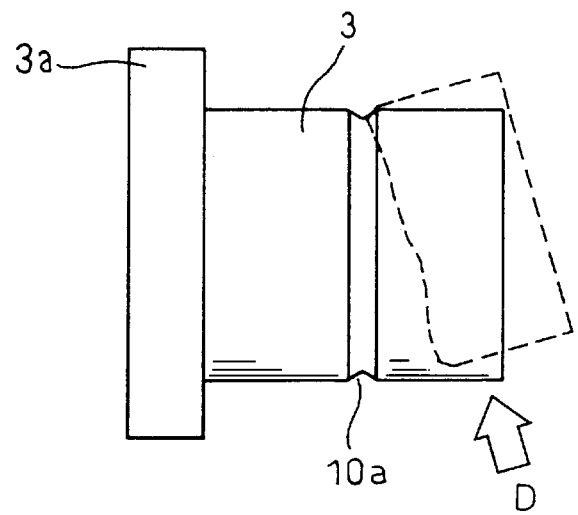
FIG. 3 is a view for explaining a removing operation of a core from the throttle body.

A cross section of the notch 10a is a V-shaped groove. As shown in FIG. 3, when external force larger than the predetermined force is applied to an end of the throttle body 1, for example, as indicated by an arrow D, while the throttle body 1 is dismantled, stresses by the external force are concentrated to the bottom of the V-shaped groove. Therefore, the throttle body 1 is readily split at the notch 10a. More particularly, when the throttle body 1 is dismantled, the throttle body 1 is clamped at one side, for example, at the flanges 3a. Then, the external force is applied to the other side as indicated by the arrow D. Thus, the body member 3 is split at the notch 10a and separated as shown in a broken line in FIG. 3.

Figure 4:
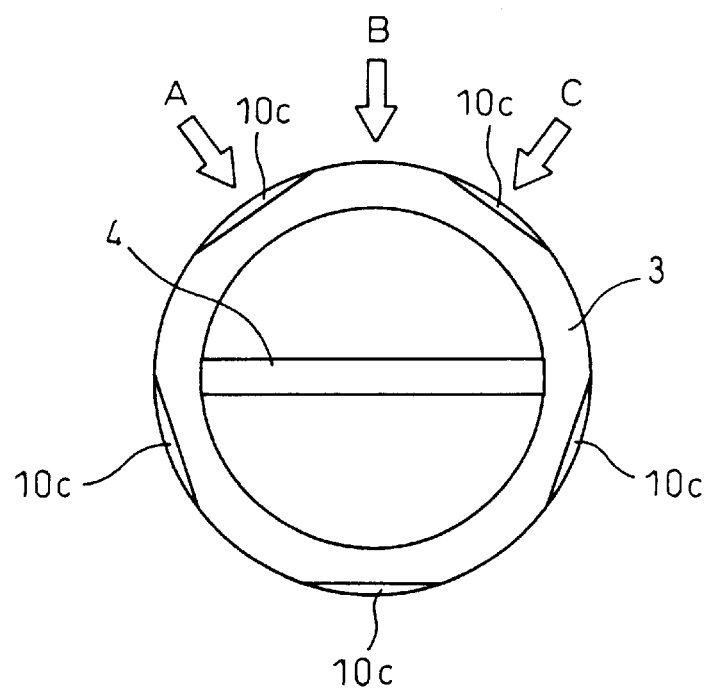
FIG. 4 is a view showing of notches, according to a modification of the first embodiment.

As shown in FIG. 4, notches 10c can be provided in place of the notch 10a. The notches 10c are discontinuously and separately formed in an identical circumferential direction of the cylindrical body member 3. Preferably, an odd number of the notches 10c is arranged at equal intervals. In FIG. 4, five notches 10c are provided, for example. The notches 10c are not arranged symmetrically with respect to the axis of the throttle body 1. Therefore, in a case that bending force is applied to the throttle body 1 against the axial direction while the throttle body 1 is used, the force is substantially equally affected thereto irrespective of positional difference in the identical peripheral direction. That is, the throttle body 1 has a substantially equal bending resistance against any bending forces applied in arrow A, B or C direction in FIG. 4. Therefore, the throttle body 1 suitably maintains its strength while it is used.

(Second Embodiment)

Figure 5A:
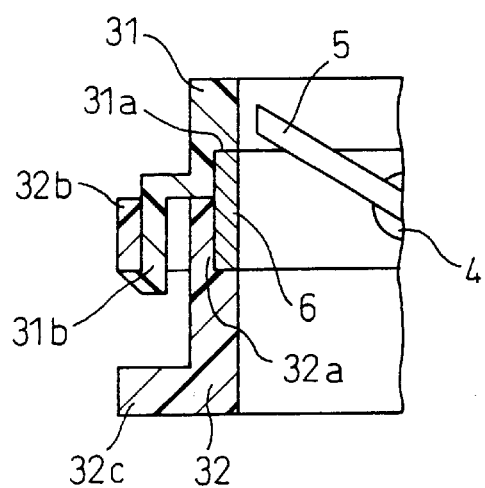
FIG. 5A is a partial cross-sectional view of a throttle body according to a second embodiment of the present invention.
Figure 5B:
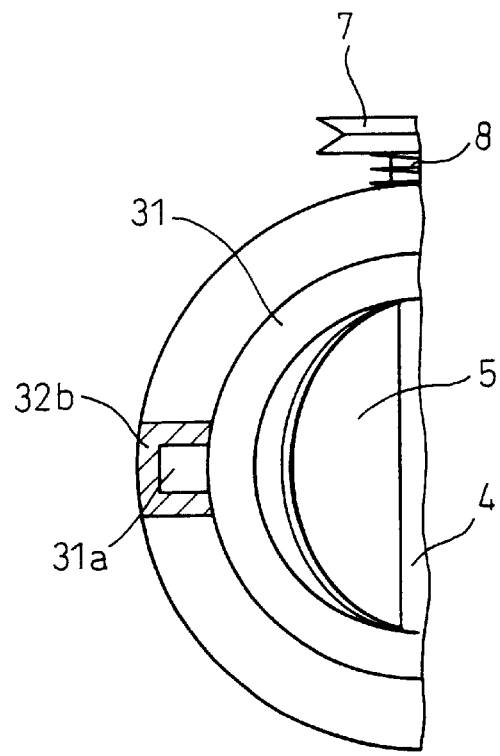
FIG. 5B is a top view showing the throttle body of FIG. 5A.

Next, a second embodiment of the present invention is described with reference to FIGS. 5A and 5B. In the second embodiment, the body member 3 of the throttle body 1 includes an upper body 31 and a lower body 32. Both of the upper body 31 and the lower body 32 are made of resin, and fitted to each other with a hook. As shown in FIG. 5A, the upper body 31 forms a recess 31a on the inner peripheral wall thereof for receiving the insert core 6. Also, an insertion hook 31b having resiliency is provided in the upper body 31 to be fitted to the lower body 32. The lower body 32 forms a recess 32a on the inner peripheral wall thereof for receiving the insert core 6. Also, the lower body 32 provides a hook receiving portion 32b for receiving the insertion hook 31b and a flange 32c through which the throttle body 1 is mounted on the engine.

During an assembly of the throttle body 1, the insert core 6 is fitted in the recesses 31a and 32a so as to be held between the upper body 31 and the lower body 32. Further, the insertion hook 31b of the upper body 31 is inserted into the hook receiving portion 32b of the lower body 32 so that the upper body 31 and the lower body 32 are fitted with the hook 31b while holding the insert core 6 therebetween. That is, both of the upper body 31 and the lower body 32 are connected by a snap-fitted connection. In this way, the throttle body 1 is readily assembled. On the other hand, during the disassembly of the throttle body 1, both of the bodies 31 and 32 and the insert core 6 are readily separated from each other by unhooking the hook 31b from the hook receiving portion 32b without using a specific tool.

In the above assembly of the throttle body 1, each of the upper body 31, the lower body 32 and the insert core 6 is described as an individual component. However, the insert core 6 may be integrated beforehand with one of the upper body 31 and the lower body 32 by insert molding. Further, the recesses 31a and 32a may be provided one of the first and the second bodies 31 and 32.

In the throttle body 1 according to the present invention, after it is used, it is easy to disassemble the throttle body 1 into the resinous body and the different material parts such as the insert core 6 and collars 9 without using the specific tool. Therefore, the above components, which are conventionally disposed or buried, are recyclable.

In the above embodiments, the present invention is exemplarily- adopted to the throttle body. However, the present invention may be used to any insert-molded member in which a resinous body and a part made of a different material are integrally molded. In this case, a notch is entirely circumferentially or partially provided on the outer wall of the insert-molded member in the proximity of a position where the different material part is molded, similar to the case of the throttle body 1. Thus, during disassembly (dismantling), when the external force larger than the predetermined force is applied to one end of the insert-molded member, the insert-molded member is readily split at the notch. As a result, the different material parts are readily removed from the resinous body, thereby making recycling easy.

The present invention should not be limited to the disclosed embodiments, but may be implemented in other ways without departing from the spirit of the invention.

What is claimed is:

1. A throttle body for an engine comprising:

a body member made of resin and having a substantially cylindrical-shape for defining an air intake passage therein; and a core made of a material different from that of the body member, and insert-molded within the body member while the body member is resin-molded, wherein the body member has a notch which is notched on an outer surface of the body member at least at a part in a circumferential direction of the body member in a proximity of a position where the core is inserted.

2. The throttle body according to claim 1, wherein the notch is continuously provided in the body member in an identical circumferential direction.

3. The throttle body according to claim 1, wherein the notch is entirely circumferentially provided in the body member in an identical circumferential direction.

4. The throttle body according to claim 1, wherein the notch is arranged on the outer surface of the body member at a part corresponding to a substantially middle of the core in an axial direction of the body member.

5. The throttle body according to claim 1, wherein the notch includes a plurality of notch portions discontinuously provided in the body member in an identical circumferential direction.

6. The throttle body according to claim 1, wherein the notch has an odd number of notch portions and the notch portions are separately arranged in the body member at substantially equal intervals in an identical circumferential direction.

7. The throttle body according to claim 1, further comprising:
- a flange integrally provided with the body member, the body member being mounted on the engine through the flange; and
- a collar made of a material different from that of the flange and insert-molded in the flange while the flange is resin-molded,
- wherein the flange has a notch that is notched on an outer surface of the flange in a proximity of the collar; and
- wherein the notch is provided in the flange in an axial direction of the body member.

8. The throttle body according to claim 7, wherein the notch has a substantially V-shape in cross-section.

9. The throttle body according to claim 1, further comprising:
- a throttle shaft rotatably provided in the body member at a position corresponding to the core in an axial direction of the body member;
- a throttle valve provided on the throttle shaft to open and close the air intake passage.

10. A throttle body for an engine comprising:
- a first body member that is a substantial cylindrical-shape for defining an air intake passage therein, made of resin, and having a hook;
- a second body member that is a substantial cylindrical-shape for defining the air intake passage therein, made of resin, and having a hook-receiving portion engaged with the hook; and
- a core made of a material different from the resin of the first and the second body members, provided in a proximity of a connecting portion between the first and the second body members, the core being disposed in the first and the second body members to define the air intake passage;
- said core being integrated with one of the first and the second body members by insert-molding.

11. The throttle body according to claim 10, wherein at least one of the first and the second body members has a recess on an inner surface thereof for receiving the core, and the core is held by the first and the second body members in the recess.

12. The throttle body according to claim 10, further comprising:
- a throttle shaft rotatably provided in at least one of the first and the second body members at a position corresponding to the core in an axial direction of the first and the second body members; and
- a throttle valve provided on the throttle shaft to open and close the air intake passage.

13. A molded unit comprising:
- a body made of resin; and
- an insert member made of a material different from that of the body, and insert-molded in the body,
- wherein the body has a notch which is notched on an outer surface of the body at a position proximate to the insert member.

14. The molded unit according to claim 13, wherein the body provides a flange for fixing the body, and the insert member is insert-molded in the flange.

15. The molded unit according to claim 14, wherein the insert member is a collar, and the notch is formed on outer surface of the flange in an axial direction of the collar.

16. The molded unit according to claim 13, wherein the body is a substantial cylindrical-shape, and the notch is continuously formed on an outer surface of the body in an identical circumferential direction.

17. The molded unit according to claim 13, wherein the body is a substantial cylindrical-shape, and the notch is partially formed on an outer surface of the body in an identical circumferential direction.

18. The molded unit according to claim 13, wherein the notch has an odd number of notch portions on an outer side surface of the body, and the odd number of notch portions is discontinuously arranged at substantially equal intervals in an identical peripheral direction.

19. The molded unit according to claim 13, wherein the body is split at the notch and the insert member is exposed from the body, when an external force larger than a predetermined force is applied to the body against an axial direction of the body.

* * * * *